(12) United States Patent
Sowatskey

(10) Patent No.: US 9,152,781 B2
(45) Date of Patent: Oct. 6, 2015

(54) SECURE MOBILE CLIENT WITH ASSERTIONS FOR ACCESS TO SERVICE PROVIDER APPLICATIONS

(75) Inventor: Nathan Sowatskey, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 13/570,304

(22) Filed: Aug. 9, 2012

(65) Prior Publication Data

US 2014/0047532 A1     Feb. 13, 2014

(51) Int. Cl.
*G06F 7/04* (2006.01)
*G06F 21/33* (2013.01)
*G06F 21/44* (2013.01)
*H04L 29/06* (2006.01)

(52) U.S. Cl.
CPC ............ *G06F 21/335* (2013.01); *G06F 21/445* (2013.01); *H04L 63/0823* (2013.01); *H04L 63/10* (2013.01); *H04L 63/168* (2013.01)

(58) Field of Classification Search
CPC ..... G06F 21/335; G06F 21/445; G06F 21/33; G06F 21/6218; H04L 63/0823; H04L 63/10; H04L 63/168; H04L 63/08; H04L 63/0807
See application file for complete search history.

(56) References Cited

U.S. PATENT DOCUMENTS

| | | | |
|---|---|---|---|
| 6,336,115 B1 | 1/2002 | Tominaga et al. | |
| 7,246,230 B2 | 7/2007 | Stanko | |
| 8,006,282 B2 | 8/2011 | Sankaran et al. | |
| 8,024,080 B2 | 9/2011 | Greene et al. | |
| 8,484,241 B2 | 7/2013 | Bouse et al. | |
| 2004/0193635 A1 | 9/2004 | Hsu et al. | |
| 2005/0135625 A1 | 6/2005 | Tanizawa et al. | |
| 2006/0021004 A1 | 1/2006 | Moran et al. | |
| 2006/0129817 A1 * | 6/2006 | Borneman et al. | 713/170 |

(Continued)

FOREIGN PATENT DOCUMENTS

| | | | |
|---|---|---|---|
| WO | 2006045402 A1 | 5/2006 | |
| WO | 2010000298 A1 | 1/2010 | |
| WO | 2011031272 A1 | 3/2011 | |

OTHER PUBLICATIONS

"Cisco Software-as-a-Service (SaaS) Access Control" Cisco, White Paper, 2010, p. 1-7.*

(Continued)

*Primary Examiner* — Ali Abyaneh
(74) *Attorney, Agent, or Firm* — Edell, Shapiro & Finnan, LLC

(57) ABSTRACT

A Software-as-a-Service (SaaS) access control application on a client device is configured with a certificate that identifies a user, and with configuration information for one or more SaaS applications to access, and including an IDP identifier for the SaaS application. The SaaS access control application includes software to be inserted into a network software stack of the client device and software configured to serve as an identity provider for assertions. A request, made by an application on the client device to a SaaS service provider identified by a Universal Resource Locator (URL) provided during configuration of the SaaS access control application, is intercepted within the network software stack of the client device. The SaaS access control application generates an assertion based on the certificate and configuration information. The requesting application is caused to make a request to the SaaS service provider with the assertion embedded in the request.

25 Claims, 5 Drawing Sheets

(56) References Cited

U.S. PATENT DOCUMENTS

| | | |
|---|---|---|
| 2006/0236382 A1 | 10/2006 | Hinton et al. |
| 2007/0271598 A1 | 11/2007 | Chen et al. |
| 2008/0127320 A1 | 5/2008 | De Lutiis et al. |
| 2008/0184354 A1 | 7/2008 | Yamazaki |
| 2009/0126007 A1* | 5/2009 | Zamberlan et al. ............ 726/19 |
| 2009/0178109 A1 | 7/2009 | Nice et al. |
| 2009/0249439 A1 | 10/2009 | Olden et al. |
| 2009/0249440 A1 | 10/2009 | Platt et al. |
| 2009/0307750 A1 | 12/2009 | Marueli et al. |
| 2010/0242105 A1 | 9/2010 | Harris et al. |
| 2011/0153854 A1 | 6/2011 | Chickering |
| 2011/0154443 A1 | 6/2011 | Thakur et al. |
| 2011/0162055 A1 | 6/2011 | Hinton et al. |
| 2011/0179478 A1 | 7/2011 | Flick |
| 2011/0265155 A1 | 10/2011 | Liu |
| 2012/0054625 A1 | 3/2012 | Pugh et al. |
| 2012/0096271 A1 | 4/2012 | Ramarathinam et al. |
| 2012/0144034 A1* | 6/2012 | McCarty ....................... 709/225 |
| 2012/0216268 A1* | 8/2012 | Kassaei et al. .................... 726/9 |
| 2012/0278487 A1 | 11/2012 | Woelfel |
| 2012/0278872 A1 | 11/2012 | Woelfel et al. |
| 2013/0007867 A1 | 1/2013 | Sowatskey et al. |
| 2013/0111549 A1 | 5/2013 | Sowatskey et al. |
| 2013/0139241 A1 | 5/2013 | Leeder |
| 2013/0227099 A1 | 8/2013 | Hinton et al. |
| 2013/0297700 A1 | 11/2013 | Hayton et al. |

OTHER PUBLICATIONS

Profiles for the OASIS Security Assertion Markup Language (SAML) V2.0, OASIS Standard, Mar. 15, 2005, John Hughes et al., OASIS Open 2005.

International Search Report and Written Opinion in counterpart International Application No. PCT/US2013/046679, mailed Nov. 5, 2013, 8 pages.

Lewis, et al., "Web Single Sign-On Authentication using SAML," IJCSI International Journal of Computer Sceince Issues, vol. 2, Sep. 2009, pp. 41-48.

Al-Sinani, et al., "A Universal Client-Based Identity Management Tool," Public Key Infrastructures, Services and Applications, Springer Berlin Heidelberg, Sep. 2011, pp. 49-74.

Cisco, "Cisco Software-as-a-Service (SaaS) Access Control," White Paper, Apr. 2010, pp. 1-7.

Wikipedia, "Security Assertion Markup Language", Obtained May 2014, http://en.wikipedia.org/wiki/Security_Assertion_Markup_Language, 11 pages.

* cited by examiner

SECURE MOBILE CLIENT WITH ASSERTIONS FOR ACCESS TO SERVICE PROVIDER APPLICATIONS

TECHNICAL FIELD

The present disclosure relates to managing identity and/or authorization assertions and related processes used when enabling access of applications running on a client device to Software-as-a-Service applications.

BACKGROUND

Typically, to achieve an acceptable level of assurance about the validity of identity or authorization asserted for the purposes of access to enterprise or cloud systems, the identity and/or authorization assertion (hereinafter "assertion") needs to be validated against an identity or authorization system that can perform validation processes within a secure and controlled context. Such systems include enterprise or cloud-hosted systems that authenticate against an active directory, or similar database, within secure and controlled environments managed by trusted entities.

Applications deployed on mobile devices are typically not designed to use enterprise or cloud-managed identity or authorization infrastructure, and instead use proprietary systems, with potentially unknown levels of security, outside of the control of the enterprise or user. This is both inconvenient for the user, as they have to manage multiple sets of credentials, and insecure for the enterprise as employees will be mixing corporate and private applications on the same device. This mix of applications from different sources, and the potential for loss or theft leading to unauthorized use, introduces the risk that a client application or underlying operating system can be compromised in a way that allows for credentials or assertions to be maliciously intercepted on the device.

DESCRIPTION OF EXAMPLE EMBODIMENTS

Overview

A Software-as-a-Service (SaaS) access control application on a client device is configured with a certificate that identifies a user, and with configuration information for one or more SaaS applications that the user may access, and information to identify an identity provider for a given SaaS application. The SaaS access control application includes software to be inserted into a network software stack of the client device and software configured to serve as an identity provider for assertions. A request, made by an application on the client device to a SaaS service provider identified by a Universal Resource Locator (URL) provided during configuration of the SaaS access control application, is intercepted within the network software stack of the client device. The SaaS access control application generates an assertion based on the certificate and the configuration information provided during configuration of the SaaS access control application and interacts with the application request such that the assertion is embedded in the request by the application to the SaaS service provider.

Example Embodiments

Figure 1:
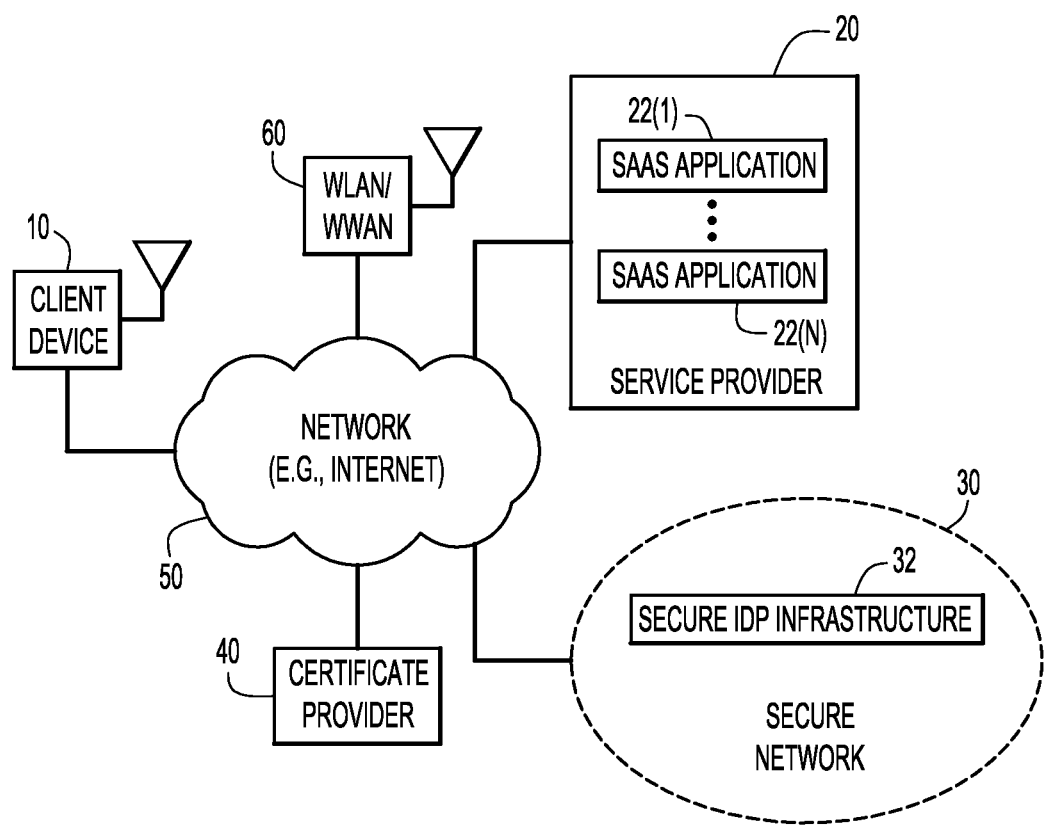
FIG. 1 is a system level block diagram showing a mobile client device obtaining access to a Software-as-a-Service application hosted by a service provider according the techniques described herein.

Referring first to FIG. 1, a network computing environment is shown comprising a client device 10, a service provider 20, a secure network 30 and a certificate provider 40. The client device 10 may be a mobile device allocated to a user who is part of an enterprise and receives computing services provided by the secure network 30. The secure network includes secure identity provider (IDP) infrastructure 32.

The service provider 20 hosts one or more Software-as-a-Service (SaaS) applications shown at 22(1)-22(N). There may be multiple service providers, each of which hosts one or more SaaS applications. For simplicity, a single service provider 20 is shown in FIG. 1. The client device 10 communicates with the secure network 30, service provider 20 and certificate provider 40 by way of the network 50, e.g., the Internet, and may have wireless connectivity provided by a wireless local area network (WLAN) or wireless wide area network (WWAN) 60, e.g., 3G, 4G, EDGE, etc. The client device 10 also may have standard wired Ethernet network connectivity as depicted by the direct connection to the network 50.

In one example use case, the secure network 30 is an enterprise network for an enterprise, and the secure IDP infrastructure 32 is an enterprise IDP infrastructure. The enterprise may be, for example, a business enterprise. The enterprise may have relationships with one or more SaaS applications to which its employees (users) may have access from their client devices. For example, a business enterprise may have a relationship with a service provider hosting one or more SaaS applications, e.g., SalesForce.com, to which employees of that business enterprise may require access. In another example use case, the secure network 30 is not an enterprise network. The secure IDP infrastructure 32 in this non-enterprise use case is a cloud-hosted IDP infrastructure, and the user has a relationship with one or more personal service type SaaS applications that the user wishes to access, such as the Facebook™ social network, the Yahoo™ portal, the Google™ portal, etc.

In the enterprise use case, a user can take the client device 10 outside the enterprise network 30, as shown in FIG. 1, but still wish to use one or more of the SaaS applications 22(1)-22(N) that are hosted by the service provider 20.

Figure 2:
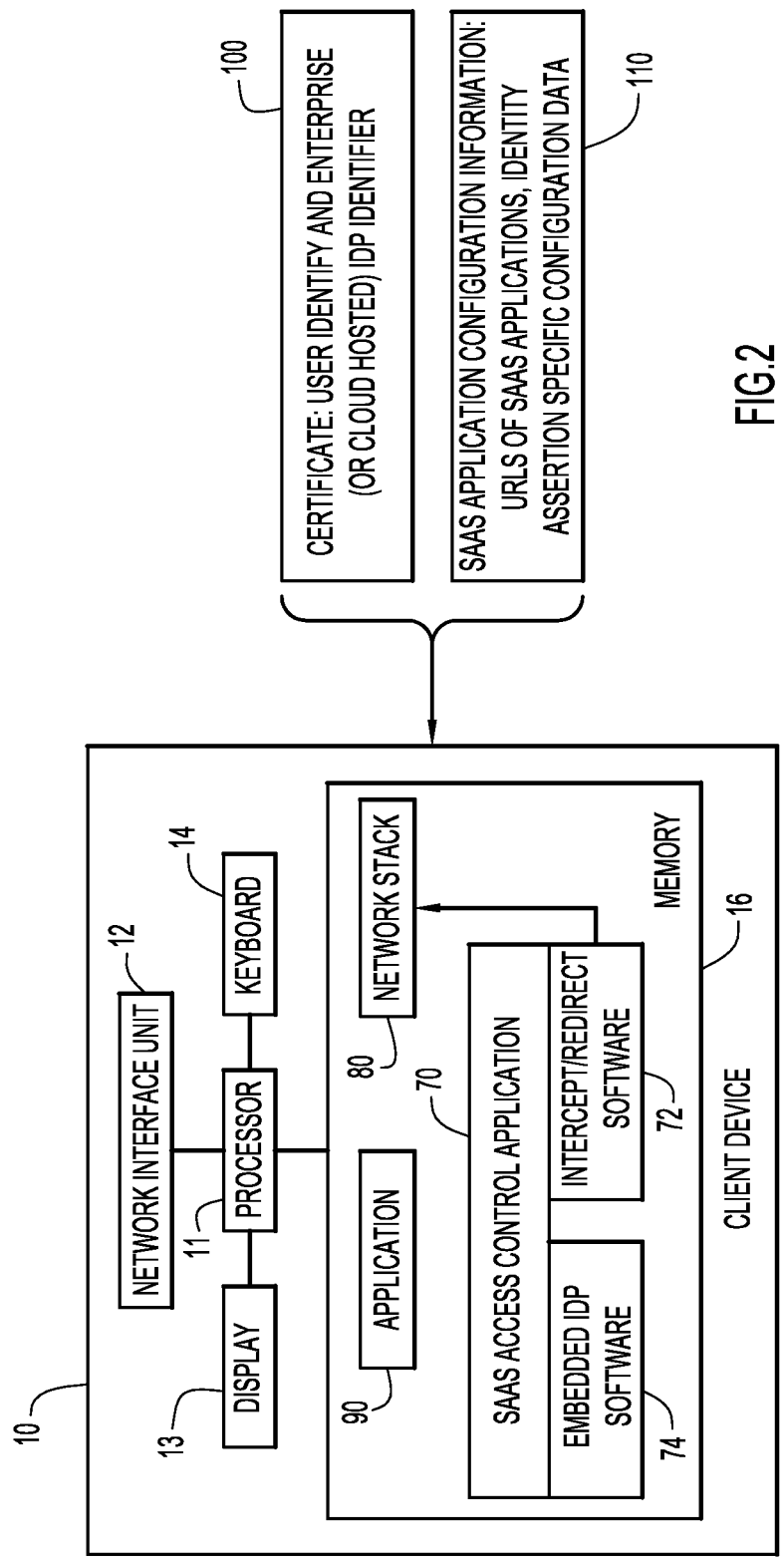
FIG. 2 is a block diagram of a mobile client configured to obtain access to a Software-as-a-Service application initiated by an assertion generated on the mobile client.

Reference is now made to FIG. 2 for a more detailed description of the client device 10, with continued reference to FIG. 1. The client device 10 may be any device with computing and/or communication capabilities in various forms or ranges of computing power, including a standalone desktop computer, laptop computer, tablet computer with some or little computing power (e.g., thin clients), Smartphone devices, etc. FIG. 2 is meant to be a generalized block diagram of the client device 10, and it should be understood that there are numerous other components that may be part of the client device that may not pertain to the techniques described herein.

The client device 10 includes a processor 11, a network interface unit 12, a display 13 (e.g., a touch screen display), an optional keyboard (and associated pointing device, e.g., an optional mouse) 14 and memory 16. The processor 11 may comprise one or more microprocessors or microcontrollers. The network interface unit 12 includes a wired and/or wireless network interface card that enables network connectivity on behalf of the client device 10.

The memory 16 stores data to be used by the client device 10, as well as processor executable instructions that, when executed by the processor 11, cause the processor 11 to perform its various operations, including the operations described herein. To this end, the memory 16 stores instructions for a SaaS access control application 70 that includes network traffic intercept/redirect software 72 and embedded IDP software 74. As will be described further hereinafter, the intercept/redirect software 72 is to be inserted into a network stack 80 of the client device, and the embedded IDP software is configured to serve as an identity provider for identity and/or authorization assertions to be made on behalf of a user of the client device 10. The SaaS access control application 70 enables access by an application on the client device 10, e.g., application 90, to one or more of the SaaS applications 22(1)-22(N) at the service provider 20. For simplicity, and without loss of generality, the term "assertion" is used here to refer to an identity and/or authorization assertion.

The memory 16 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 16 may comprise one or more tangible (non-transitory) computer readable storage media (e.g., a memory device) encoded with software comprising computer executable instructions and when the software is executed (by the processor 11) it is operable to perform the operations described herein.

According to the techniques described herein, the SaaS access control application 70 is provisioned with an identity certificate/token, and that certificate can be used to generate an assertion as described herein. An example of the token/certificate is shown at 100 in FIG. 2, and includes information identifying a user (user's enterprise identity) and information identifying an identity provider for a given SaaS application. In the enterprise use case, the information indicating the identity provider is an indication of the enterprise (enterprise IDP infrastructure) for the client device/user for a given SaaS application. In the non-enterprise (personal services) use case, the information identifying the identity provider is an indication of a cloud-hosted IDP for a given SaaS application with which the user has a relationship for personal services. The SaaS access control application 70 may be configured with a plurality of certificates, each certificate associated with a given (set of) SaaS application(s) and accordingly including information indicating a different cloud-hosted IDP.

In addition, the SaaS access control application 70 is provisioned with SaaS application configuration information 110 that includes Universal Resource Locators (URLs) of SaaS applications (e.g., SaaS applications 22(1)-22(N) of service provider 20) and assertion specific configuration data.

Using the certificate 100, and the role of the SaaS access control application 70 in the network stack between client applications and the servers the client applications are interacting with, the SaaS access control application 70 can intercept interactions between the service provider and the client application 90, and intercede in those interactions to provide assertions to the service provider, on behalf of the client application 90, so that the client application 90 does not prompt the user for credentials. The intercept/redirect software component 72 performs the intercepting function and the embedded IDP software component 74 performs the assertion generation function. As described further hereinafter, the embedded IDP software 74 may generate the assertions according to the Security Assertion Markup Language (SAML) protocol or other authentication or authorization protocols, such as the OAuth protocol.

One of the challenges with using a certificate installed on a mobile device as a source of assertions is guaranteeing that the assertion has not been tampered with in the time between the creation of the assertion and the supply of the assertion, or that the assertion has not been created by a malicious third party via software installed on the device. In the case of the certificate 100 referred to above, a trade-off is made such that the certificate provides access to resources commensurate with the level of assurance associated with the assertion and the level of assurance required to access given resources.

The level of assurance (LOA) associated with the assertion required to access the resources is a function of various factors, including, but not limited to, other security features also installed on the device, the value of the resources being accessed, the tradeoff between risk and user experience that is acceptable to the resource owner, the Time-to-Live (TTL) value of the assertion and so on. The techniques described herein allow the client device owner and resource owner to manage the specific combination of risk mitigation and user experience factors. The risk assessment for a given device and OS will vary according to whether, for example, the device is part of a mobile device management scheme, is running a secure operating system, has been "jail broken", etc.

For example, to improve the user experience, and to avoid the risk of exposing the corporate credentials on the client device, the certificate 100 can be used for application access. Thus, the certificate is managed in a way that reduces the time window within which the certificate, or client device, can be compromised, but which provides for a better user experience, and reduced exposure of the corporate credentials during application login. The identity used for applications can additionally be subject to controls that allow, for example, pseudonymity or other translations between user identity and SaaS application identity.

Thus, under some circumstances identity can be asserted from a client device, using the embedded IDP functionality 74 to application level services. The issue is what is needed to achieve the appropriate trade off between the desire for tight security and the desire for a good user experience.

Figure 3:
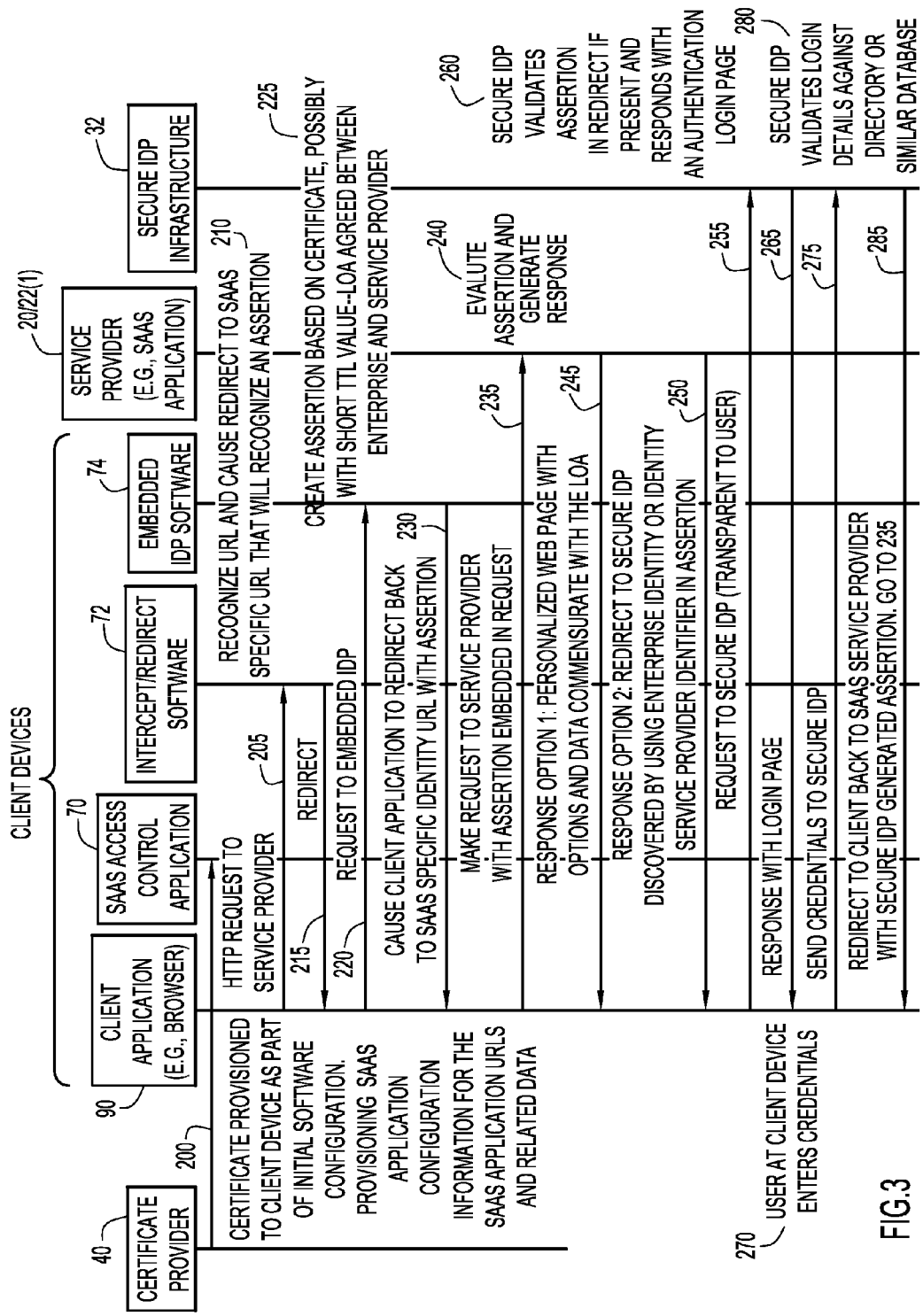
FIG. 3 is a flow diagram that illustrates the steps of a procedure to allow a mobile client configured to obtain access to a Software-as-a-Service application initiated by an assertion generated on the mobile client.

Reference is now made to FIG. 3 for a detailed description of a flow among the entities shown in FIG. 1 to facilitate the transparent assertions to a service provider from a client device outside the enterprise network. At 200, as part of initial software configuration of the client device 10, the certificate 100 is provisioned to or created on the SaaS access control application. The TTL value of the assertions derived from the certificate 100 is configurable in a way that allows the enterprise to manage its risks, also taking into account authentication mechanism, client device operating system type, location, other controls on the client device and so on, as described above.

In addition, at this time the SaaS access control application can be provisioned with configuration information 110 for one or more SaaS applications to be accessed. As explained above, the configuration information includes one or more URLs and assertion specific configuration data for one or more SaaS applications. The configuration information 110 provides the SaaS access control application with awareness of specific cloud services, and which levels of assurance, each SaaS application requires as described above. As described further below, when a specific cloud service is accessed, an assertion is created by the embedded IDP software of the SaaS access control application and the embedded IDP software is configured to operate as an IDP to provide the assertion directly from the SaaS access control application to a SaaS application. This is transparent to the user and both the application and the application server. The identity in the assertion to the SaaS application is based on the user identity from certificate 100. A TTL value in the assertion is set according to level of risk and desired user experience, as described above.

The certificate 100 provisioned during the initial configuration can be used to assert an identifier for a secure IDP (enterprise IDP or cloud-hosted IDP) for a given SaaS application. This IDP identifier is useful to the receiving SaaS application as it allows the SaaS application to carry out the function of IDP discovery.

There is no guarantee, once the certificate/assertion is on the client device, that the certificate or assertions cannot be tampered with. However, as explained above, it is not necessary to extend a great deal of trust, i.e. to have a high level of assurance, but rather just enough trust to personalize the user experience and allow the SaaS application to locate an IDP according to the SaaS application the user is seeking to access as described above.

At 205, the client application 90, e.g., a browser, on the client device 10, makes a Hypertext Transport Protocol (HTTP) request with a URL pointing to one of the SaaS applications on the service provider 20, e.g., SaaS application 22(1).

At 210, the intercept/redirect software component 72 (that is inserted into the network stack 80 of the client device 10) recognizes that the HTTP request is to one of the URLs for one of the SaaS applications for which it has been configured (because this information was contained in the configuration information for the SaaS access control application) and intercepts the HTTP request. All traffic passes through the intercept/redirect software component 72 that looks for requests to specific domains/URLs as that component is an integral part of the network software stack.

The HTTP request to the service provider is intercepted before it actually gets to the service provider (SaaS Application). At 215, the intercept/redirect software component 72 sends an HTTP redirect to the client application (browser) 90 to, in one variation of these techniques, cause, at 220, the client application 90 to make an identity provider request to the embedded IDP software 74 on the client device itself.

The embedded IDP software 74 receives the identity provider request and at 225, generates an assertion based on the certificate 100 (provisioned/configured at step 200) and the configuration information provided at the time of configuration of the SaaS access control application. For example, the embedded IDP software 74 is configured to generate a SAML identity assertion, OAuth authorization assertion, or other similar/comparable mechanisms involving the assertion of identity and/or authority. Thus, the embedded IDP software 74 is configured to generate assertions in accordance with any one or more protocols now known or hereinafter developed, including the SAML protocol and/or the OAuth protocol. The assertion generated at 225 may have a relatively short TTL value according to the balance determined for the risk/user experience tradeoff as described above.

At 230, the embedded IDP software 74 causes the client application to redirect the client application (browser) back to the service provider, typically at a URL that expects assertions, which will be different URL than the HTTP request at step 205, with the assertion in the request. At 235, the client application makes an HTTP request to the service provider, with the assertion in the request, typically to a URL that represents part of the target SaaS application that expects an assertion in the request.

Step 230 is performed when the embedded IDP software 74 generates a SAML identity assertion. This is only one option. Another option is one in which the assertion is inserted inline, i.e. without a redirect, which is also possible for SAML, and other identity and/or authorization protocol interactions where the URL at 205 represents part of the target system that expects and can process assertions. In this case, the embedded IDP software 74 generates an assertion and inserts it in the HTTP request made at 235 to the service provider as that request passed through the network stack.

At 240, the service provider evaluates the assertion and generates a response commensurate with the level of assurance. While under some circumstances this level of assurance is low relative to an identity provided by an IDP hosted in a secure network, the assertion can still be used for the purposes of allowing the service provider to grant access to low value resources, commensurate to the level of assurance, or otherwise personalize the user experience. Further, the domain, or other company data in the assertion, provided by the embedded IDP software on the client device, can be used by the service provider.

FIG. 3 shows examples of two, among many possible, options upon evaluation of the assertion received from the client device at 240 and the level of assurance to be used for each SaaS application. The SaaS service provider stores information that represents a level of assurance of an assertion required for access to resources managed by each SaaS application, and generates a response, granting access to resources, that is based on the level of assurance for the assertion received from the client accessing a SaaS application and the level of assurance associated with resources in that SaaS application. One option, at 245, is to present a personalized web page that contains content (data and options) commensurate with the level of assurance associated with the assertion of the user for that SaaS application. This could be, for example, a page acknowledging the user identity and inviting them to login via a secure IDP (enterprise IDP or cloud-hosted IDP), or other identity or authorization system recognized by the SaaS application and the user.

Another option, at 250, is to send a response to the client device to cause it to be redirected to the secure IDP discovered by using IDP identity information contained in the request (with the assertion) made to the service provider by the client device at 235. The automatic discovery of the identity of the secure IDP may be based on information previously supplied to the SaaS service provider, e.g., when an enterprise entered into an agreement with the SaaS service provider in the enterprise-use case. Other examples of this information include a mapping from the enterprise name in the assertion to the IP address or URL of the enterprise IDP, and a similar mapping from a service provider name to the IP address or URL of a cloud-hosted IDP. Still another response may be a message denying access to a SaaS application, or a message granting access to a SaaS application followed by providing access from the client device to the SaaS application.

At 255, the client application 90 makes a request to the secure IDP in such a manner that it is transparent to the user at the client device 10. At 260, the secure IDP validates the assertion (in redirect) if present and responds with an authentication login web page at 265. The secure IDP hosts this login web page. At 270, the user at the client device enters his/her credentials and the credentials are sent to the secure IDP at 275. At 280, the secure IDP validates the login credentials against a directory or similar database, and if the credentials are validated, the secure IDP generates an assertion (called a "secure IDP assertion") for/on behalf of the user of the client device. At 285, the secure IDP redirects the client back to the service provider with the secure IDP assertion, so that the client device follows the operations at step 235 in FIG. 3, where the service provider evaluates the secure IDP assertion at 240 to determine whether (and how) to grant access to a SaaS application for the client device. The operations performed after the service provider evaluates the secure IDP assertion are similar to those described above in connection with steps 245 and 250. The assertion in the redirect at 250 from the service provider to the secure IDP and back again to the service provider is useful as a means of mutual authentication so that the two ends can avoid spoofing attacks.

In the flow shown in FIG. 3 and described above, the interactions between the application making an HTTP request to connect to a service provider, the interception in the network stack, the use of the certificate to assert identity and discover the secure IDP, and the workings of SAML over HTTP, are transparent to the client application. As far as the client application is concerned, the exchanges are standard SAML/HTTP so the client application does not need to be made aware of the functions of the intercept/redirect software 72 and the embedded IDP software 74.

Figure 4:
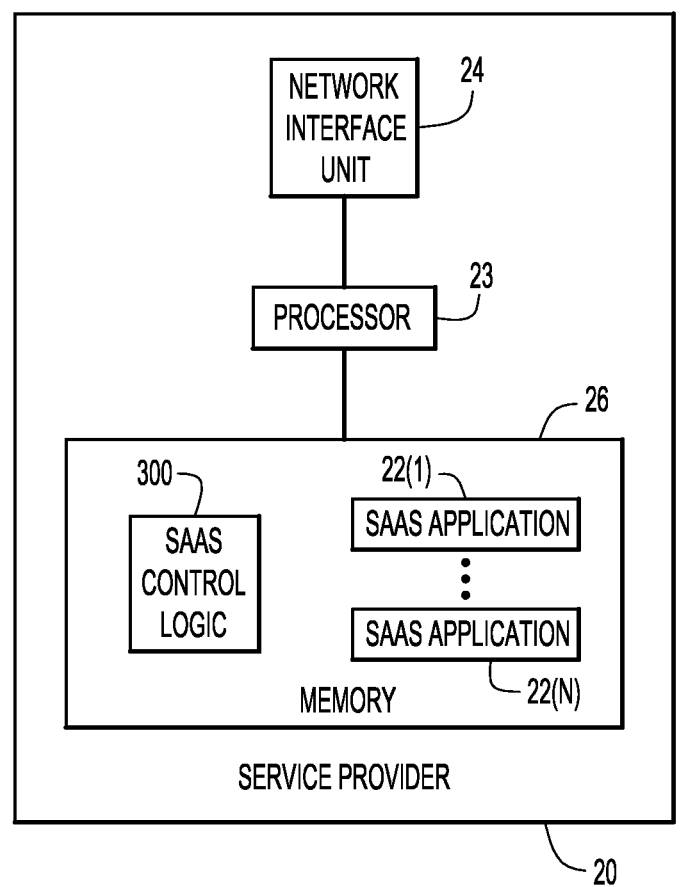
FIG. 4 is an example of a block diagram of a service provider configured to participate in the procedure depicted in FIG. 3.
Figure 5:
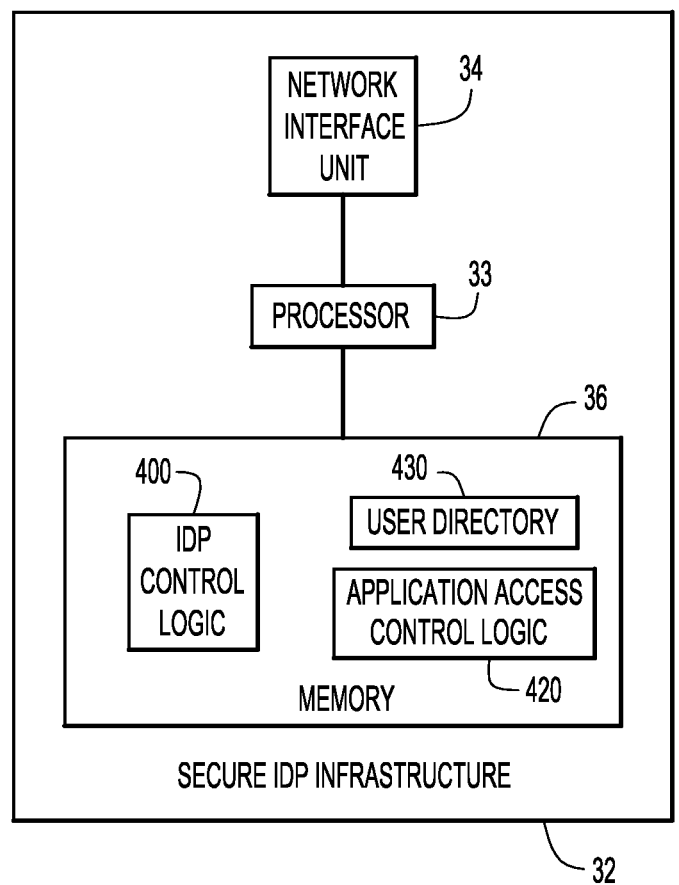
FIG. 5 is an example of a block diagram of secure identity provider infrastructure configured to participate in the procedure depicted in FIG. 3.

Reference is now made to FIGS. 4 and 5. FIG. 4 illustrates an example of a block diagram of the service provider 20. The service provider 20 comprises a processor 23, network interface unit 24 and memory 26. The network interface unit 24 enables network communication on behalf of the service provider 20. The processor executes software instructions stored in memory 26, including instructions associated with the SaaS applications 22(1)-22(N) and instructions associated with SaaS control logic 300. The SaaS control logic 300 comprises instructions that, when executed by the processor 23, cause the processor to perform service provider operations described in connection with FIG. 3, e.g., operations 240, 245 and 250.

FIG. 5 illustrates an example of a block diagram of the secure IDP infrastructure 32. The secure IDP infrastructure 32 comprises a processor 33, network interface unit 34 and memory 36. The network interface unit 34 enables network communication on behalf of the secure IDP 32 infrastructure. The memory 36 stores instructions for IDP control logic 400, data for a directory 410 and instructions for application access control logic 420. The instructions for the IDP control logic 400 cause the processor 33 to perform the secure IDP functions described in connection with FIG. 3, e.g., operations 260, 265, 280 and 285 in conjunction with data stored in the directory 410. The application access control logic 420 interacts with authorization and/or access control policies, defined by the enterprise (in the enterprise use case) or by an identity service provider (in the personal services use case) to govern access to SaaS applications, to determine whether a given employee may access a given SaaS application under circumstances dictated by the policy and the type of access being requested. For example, the access control logic 420 might deny access to the SaaS application from a mobile device.

In summary, SaaS access control software on a client device is configured to operate as an IDP and is configured with information about specific cloud services that can accept identity (e.g., SAML) assertions, and the specific formats of those assertions, including which levels of assurance, TTLs and other security parameters, relative to a given organization's risk assessment.

This mechanism involves a tradeoff between user experience and levels of assurance, relative to the requirements of specific SaaS applications. As described above, a variety of factors associated with the assertion can managed according to the level of assurance for the assertion. These include TTL, i.e. the time window within which to trust the identity that is asserted, accompanied by service specific configurations to map the security profile of the device to accepted levels of assurance for a given application. The assertions are transparently inserted into interactions between client applications and service provider applications so that the certificate is used as the basis for the identity of the user of the client application, and further interactions to provide identity with higher levels of assurance, without requiring the user to provide identity credentials explicitly on the device, where they may be maliciously intercepted.

The user experience is improved because the user can obtain secure access to various applications, particularly applications that are in the cloud, without the need to manage or enter credentials on the device. Furthermore, corporate credentials are not exposed as often, and are not exposed via potentially untrusted or compromised applications. Additionally, the techniques operate at the client, without requiring additional network infrastructure.

The techniques described above also involve, from the perspective of a SaaS service provider, receiving from a client device a request to access a Software-as-a-Service (SaaS) application, the request including an assertion created by a SaaS access control application on the client device; evaluating the assertion; and generating a response to the client device based on the evaluation. The response may involve sending a message denying or granting access to a SaaS application, presenting a web page to the client device that contains data and options commensurate with a level of assurance associated with the assertion, or sending a message to the client device to cause the application to be directed to a web page hosted by a secure identity provider, wherein the web page is configured to solicit entry of credentials from the user of the client device. Furthermore, the SaaS service provider may discover the secure identity provider using information contained in the assertion embedded in the request to the SaaS service provider. The secure identity provider may be an enterprise identity provider that has a relationship with the SaaS application, or a cloud-hosted identity provider associated with the SaaS application with which the user has a relationship. Further still, the SaaS service provider may store information representing a level of assurance required for access to resources controlled by each SaaS application, wherein generating the response is based on the assertion received for a SaaS application and the level assurance associated with that SaaS application.

From the perspective of a secure identity provider, a method is provided comprising: presenting a web page to a client device that has been redirected to the secure identity provider by a service provider that hosts one or more Software-as-a-Service applications, wherein the web page is configured to solicit entry of credentials from a user of the client device; receiving the credentials from the client device; evaluating the credentials; generating an secure identity provider assertion for the client device; and redirecting the client device back to the service provider with the secure identity provider assertion for evaluation by the service provider. The secure identity provider may be an enterprise identity provider for an enterprise that has a relationship with the one or more SaaS applications, or a cloud-hosted identity provider associated with a SaaS application with which the user has a relationship.

The above description is intended by way of example only.

What is claimed is:

1. A method comprising:
    configuring a Software-as-a-Service (SaaS) access control application, which executes on a client device, with a certificate that identifies a user, configuration information for one or more SaaS applications to access and information to identify an identity provider for a given SaaS application, the SaaS access control application including software to be inserted into a network software stack that executes on the client device and further including embedded identity provider software configured to serve as an identity provider for assertions;
    intercepting, within the network software stack of the client device, a request made by an application on the client device to a SaaS service provider identified by a Universal Resource Locator (URL) provided during configuration of the SaaS access control application;
    redirecting the request made by the application back to the application causing the application to make an identity provider request to the embedded identity provider software executing on the client device;
    generating, by the embedded identity provider software, an assertion based on the certificate and on configuration information provided during configuration of the SaaS access control application; and
    causing the application to make a request to the SaaS service provider with the assertion embedded in the request.

2. The method of claim 1, further comprising:
    receiving the assertion at the SaaS service provider;
    evaluating the assertion; and
    generating a response to the client device based on the evaluating.

3. The method of claim 2, wherein generating a response comprises sending a message denying or granting access to a SaaS application.

4. The method of claim 2, wherein generating a response comprises presenting a web page to the client device that contains data and options commensurate with a level of assurance associated with the assertion.

5. The method of claim 2, wherein generating a response comprises sending a message to the client device to cause the application to be directed to a web page hosted by a secure identity provider, wherein the web page is configured to solicit entry of credentials from the client device.

6. The method of claim 5, further comprising the secure identity provider evaluating the credentials received from the client device, generating a secure identity provider assertion, redirecting the client device back to the SaaS service provider with the secure identity provider assertion, and the SaaS service provider evaluating the secure identity provider assertion to determine whether to grant access to a SaaS application.

7. The method of claim 5, further comprising discovering the secure identity provider using information contained in the assertion embedded in the request to the SaaS service provider.

8. The method of claim 7, wherein discovering is further based on information previously supplied to the SaaS service provider.

9. The method of claim 5, wherein the certificate further identifies an enterprise that has a relationship with the one or more SaaS applications, and wherein the secure identity provider is an enterprise identity provider.

10. The method of claim 5, wherein the certificate further identifies a cloud-hosted identity provider associated with a SaaS application with which the user has a relationship, and wherein the secure identity provider is the cloud-hosted identity provider.

11. The method of claim 1, further comprising storing at the SaaS service provider information representing a level of assurance of the assertion required for access to each SaaS application, wherein generating the response is based on the assertion received for a SaaS application and the level assurance required for access to that SaaS application.

12. The method of claim 1, wherein the assertion includes a time-to-live value set to determine a time window within which to trust the assertion.

13. The method of claim 1, wherein the configuration information includes one or more URLs and assertion specific configuration data for one or more SaaS applications.

14. The method of claim 1, wherein the embedded identity provider software that is configured to serve as an identity provider is configured to generate assertions in accordance with one or more of: the Security Assertion Markup Language (SAML) protocol and/or OAuth protocol.

15. One or more non-transitory computer readable storage media encoded with software comprising computer executable instructions and when the software is executed operable to:
    configure a Software-as-a-Service (SaaS) access control application, which executes on a client device, with a certificate that identifies a user, configuration information for one or more SaaS applications to access and information to identify an identity provider of a given SaaS application, the SaaS access control application including software to be inserted into a network software stack that executes on the client device and further including embedded identity provider software configured to serve as an identity provider for assertions;
    intercept, within the network software stack of the client device, a request made by an application on the client device to a SaaS service provider identified by a Universal Resource Locator (URL) provided during configuration of the SaaS access control application;
    redirect the request made by the application back to the application causing the application to make an identity provider request to the embedded identity provider software executing on the client device;
    generate, by the embedded identity provider software, an assertion based on the certificate and on configuration information provided during configuration of the SaaS access control application; and
    cause the application to make a request to the SaaS service provider with the assertion embedded in the request.

16. The computer readable storage media of claim 15, wherein the embedded identity provider software that is configured to serve as an identity provider is configured to generate identity assertions in accordance with one or more of: the Security Assertion Markup Language (SAML) protocol and/or OAuth protocol.

17. The computer readable storage media of claim 15, wherein the configuration information includes one or more URLs and assertion specific configuration data for one or more SaaS applications.

18. The computer readable storage media of claim 15, wherein the assertion includes a time-to-live value set to determine a time window within which to trust the assertion.

19. The computer readable storage media of claim 15, wherein the certificate further identifies an enterprise that has a relationship with the one or more SaaS applications.

20. The computer readable storage media of claim 15, wherein the certificate further identifies a cloud-hosted identity provider associated with a SaaS application with which the user has a relationship.

21. A device comprising:
a network interface unit configured to enable network communications over a network;
a memory; and
a processor coupled to the network interface unit and to the memory, wherein the processor is configured to:
configure a Software-as-a-Service (SaaS) access control application stored in the memory of the device with a certificate that identifies a user, configuration information for one or more SaaS applications to access and information to identify an identity provider for a given SaaS application, the SaaS access control application including software to be inserted into a network software stack that is stored in the memory of the device and further including embedded identity provider software configured to serve as an identity provider for assertions;
intercept, within the network software stack, a request made by an application on the device to a SaaS service provider identified by a Universal Resource Locator (URL) provided during configuration of the SaaS access control application;
redirect the request made by the application back to the application causing the application to make an identity provider request to the embedded identity provider software executing on the client device;
generate, by the embedded identity provider software, an assertion based on the certificate and on configuration information provided during configuration of the SaaS access control application; and
cause the application to make a request to the SaaS service provider with the assertion embedded in the request.

22. The device of claim 21, wherein the embedded identity provider software that is configured to serve as an identity provider is configured to generate assertions in accordance with one or more of:
the Security Assertion Markup Language (SAML) protocol and/or OAuth protocol.

23. The device of claim 21, wherein the configuration information includes one or more URLs and assertion specific configuration data for one or more SaaS applications.

24. The device of claim 21, wherein the assertion includes a time-to-live value set to determine a time window within which to trust the assertion.

25. The device of claim 21, wherein the processor is further configured to receive a message from a SaaS service provider to cause the application to be directed to a web page hosted by a secure identity provider, wherein the web page is configured to solicit entry of credentials from the user of the client device.

* * * * *